US 6,683,998 B2

(12) United States Patent
Atkins et al.

(10) Patent No.: US 6,683,998 B2
(45) Date of Patent: *Jan. 27, 2004

(54) APPARATUS AND METHOD OF BUILDING AN ELECTRONIC DATABASE FOR RESOLUTION SYNTHESIS

(75) Inventors: Brian Atkins, Mountain View, CA (US); Charles A Bouman, West Lafayette, IN (US); Jan P. Allebach, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/193,931

(22) Filed: Jul. 11, 2002

(65) Prior Publication Data
US 2003/0026504 A1 Feb. 6, 2003

Related U.S. Application Data

(63) Continuation of application No. 09/064,638, filed on Apr. 21, 1998, now Pat. No. 6,466,702, which is a continuation-in-part of application No. 08/837,619, filed on Apr. 21, 1997, now Pat. No. 6,075,926.

(51) Int. Cl.$^7$ ................................................ G06K 9/32
(52) U.S. Cl. ........................................ 382/300; 358/1.2
(58) Field of Search ................................ 382/205, 225, 382/260, 299, 300; 358/1.2, 3.07; 706/45; 348/208.13, 333.13

(56) References Cited

U.S. PATENT DOCUMENTS 5,579,445 A * 11/1996 Loce et al. .................. 358/1.2

OTHER PUBLICATIONS

IBM Technical Disclosure Bulletin entitled "Interpolating Images to higer resolution using a Feedfoward 'Nneural' Network", vol. 35, Issue No. IA., Jun. 1, 1992.*

* cited by examiner

Primary Examiner—Amelia M. Au
Assistant Examiner—Martin Miller

(57) ABSTRACT

An electronic database for image interpolation is generated by a computer. The computer generates a low-resolution image from a training image, a plurality of representative vectors from the low-resolution image, and a plurality of interpolation filters corresponding to each of the representative vectors. The interpolation filters and the representative vectors are generated off-line and can be used to perform image interpolation on an image other than the training image. The database can be stored in a device such as computer or a printer.

10 Claims, 6 Drawing Sheets

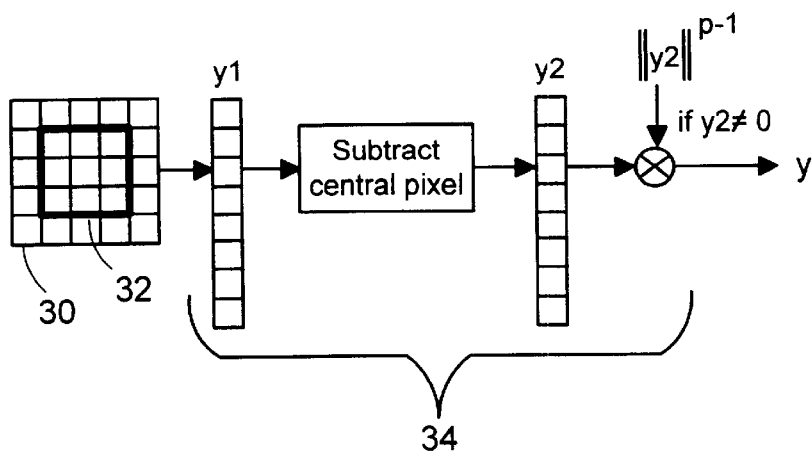
FIGURE 4
FIGURE 5
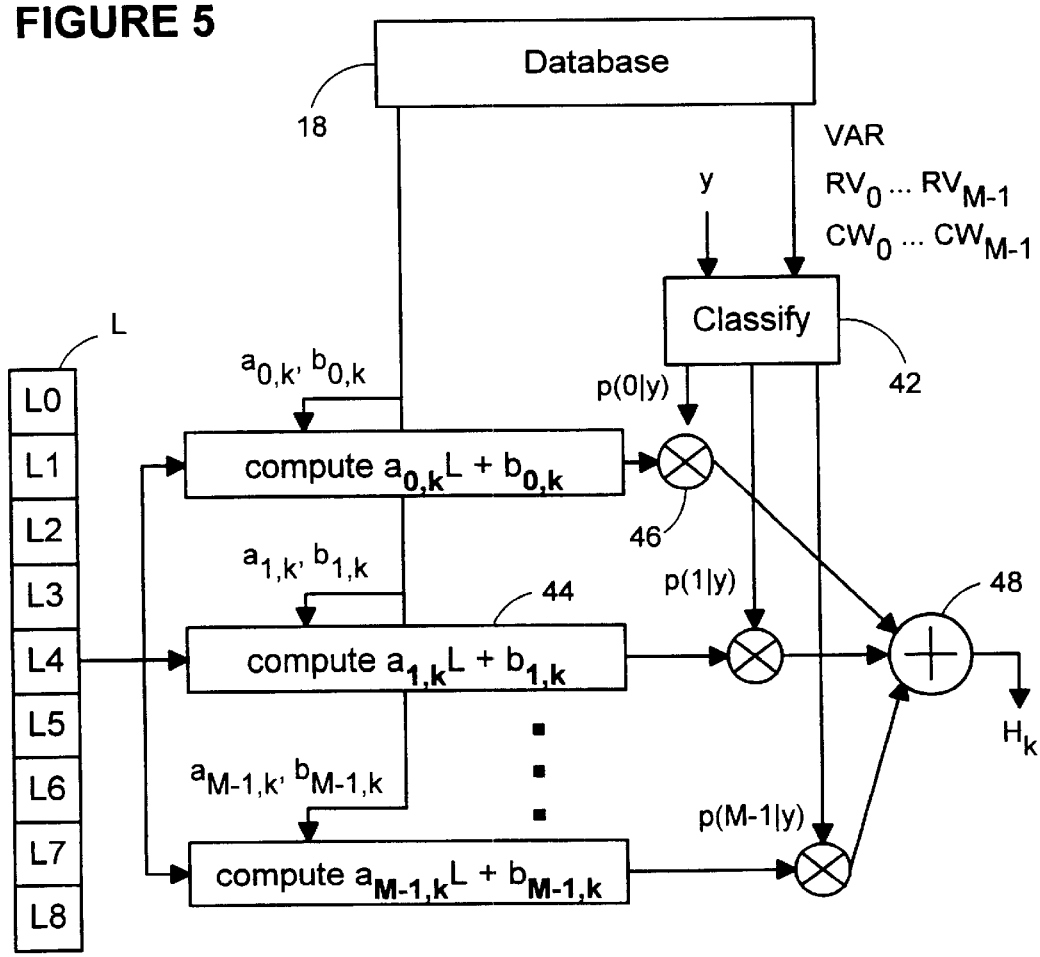

US 6,683,998 B2

APPARATUS AND METHOD OF BUILDING AN ELECTRONIC DATABASE FOR RESOLUTION SYNTHESIS

This is a continuation of Ser. No. 09/064,638 filed Apr. 21, 1998, now U.S. Pat. No. 6,466,702B1, which is a continuation-in-part of Ser. No. 08/837,619 filed on Apr. 21, 1997 now U.S. Pat. No. 6,075,926.

BACKGROUND OF THE INVENTION

The invention relates to digital imaging. More specifically, the invention relates to interpolation of higher resolution images from lower-resolution images.

Image interpolation is performed routinely by printers and computers. In one instance, a printer might receive source image data having a fixed resolution of 75 dots per inch (dpi), yet the printer is commanded to print at a higher resolution such as 300 dpi. In such an instance, the printer performs interpolation on the source image data.

In another instance, a computer might perform interpolation in order to display an image compressed according to a lossy algorithm such as JPEG. Once the image is displayed, the computer might receive a user command to zoom in on a portion of the image to magnify a particular detail. In response to the user command, the computer would perform interpolation on the pixels in that portion.

Simple linear interpolation lacks the precision necessary to reproduce an image with quality at a higher resolution. Edges in the interpolated image have poor quality. Shading problems and jagged transitions can be viewed when an interpolated image is displayed or printed. The shading problems and jagged transitions become even worse when a region of the interpolated image is magnified.

Low order B-spline methods such as pixel replication and bilinear interpolation are satisfactory in terms of interpolating smooth textures, and they are easy to implement in terms of processing power and memory requirements. However, pixel replication tends to produce sharp edges that are not straight, and bilinear interpolation tend to produce images that include artifacts and relatively blurry lines.

Higher-order B-spline interpolation methods such as cubic B-spline interpolation tend to provide smooth, continuous images. However, smoothness and continuity come at a cost: increased computational power. Higher-order B-spline interpolation methods are computationally intensive. They also give ringing effects. Additionally, B-spline methods in general are linear methods and, therefore, are limited in terms of quality of the interpolation.

Other interpolation methods include edge-directed methods, fractal interpolation and methods that employ stochastic models. For an example of a method that employs a stochastic model, see Schultz et al., "A Bayesian approach to image expansion for improved definition," IEEE Transactions on Image Processing, vol. 3, no. 3, pp. 233–242 (May, 1994). The method disclosed therein is computationally intensive.

There is a need for an image interpolation method that produces high quality images, yet is easy to implement in terms of processing power and memory requirements.

SUMMARY OF THE INVENTION

The invention can be regarded as a method of generating an electronic database of interpolation parameters that can be used to produce high quality images. The parameters can be computed from one or more training files. A low-resolution file is computed from each training file. A plurality of representative vectors from each low-resolution file are then computed. Next, a set of interpolation filters are computed for each of the representative vectors. The interpolation filters and the representative vectors can be used to perform interpolation on a file other than the training file.

The method of generating the electronic database can be performed off-line. Thus, by the time the parameters in the database are used for interpolating an image, the bulk of the computational activity has already been performed. Consequently, interpolation time and memory requirements are reduced.

The training file could be an image file. The electronic database could be stored in a device such as computer or a printer.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 illustrates the generation of a cluster vector, which forms a part of the image interpolation method according to the present invention;

FIG. 5 is an illustration of a non-linear filtering operation, which forms a part of the image interpolation method according to the present invention;

DETAILED DESCRIPTION OF THE INVENTION

Figure 1:
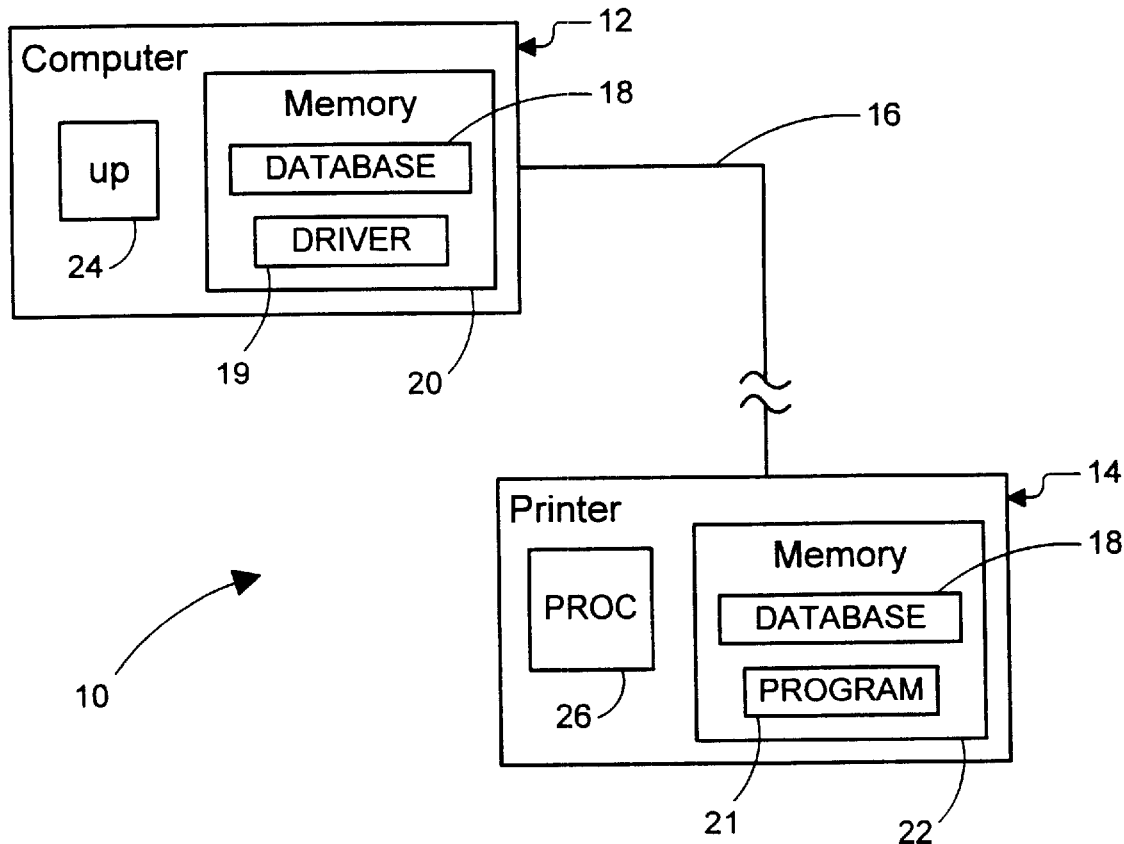
FIG. 1 is a block diagram of a system according to the present invention, the system including a printer and first and second computers.
Figure 1:
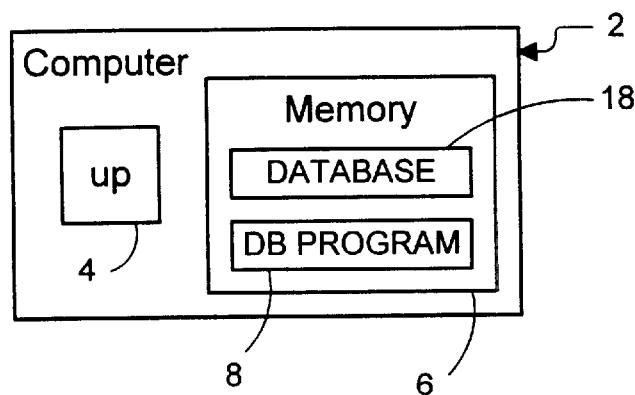

As shown in the drawings for purposes of illustration, the present invention is embodied in a method of generating an electronic database of parameters used for interpolating higher resolution images from lower resolution images. An interpolation method uses the parameters to produce images of high quality, yet the interpolation method is easy to implement in terms of processing power and memory requirements. The electronic database can be used advantageously by a system including a computer and a printer. However, as will be discussed below, the invention is not limited to generating a database for image interpolation by the computer or printer. More generally, the invention can be applied to the restoration or enhancement of speech, still images, video and other multidimensional data.

FIG. 1 shows a system 10 including a first computer 12 and a printer 14 that communicate over a cable 16. A resolution synthesis database 18 is stored in either computer memory 20 (e.g., a hard drive, an EEPROM) or in printer memory 22 (e.g., an EEPROM). The database 18 provides resolution synthesis parameters that are used for interpolating higher resolution images from lower resolution images.

Resolution synthesis (i.e., interpolation using the resolution synthesis database 18) can be performed by a host processor 24 in the first computer 12 or by an embedded processor 26 in the printer 14.

The database 18 includes a first group of parameters for resolution synthesis at a first interpolation factor, a second group of parameters for resolution synthesis at a second interpolation factor, a third group for resolution synthesis at a third interpolation factor, and so on. Any positive integer could provide a suitable interpolation factor. If, for example, the image has a resolution of 75 dpi, but it will be printed at a resolution of 300 dpi, a group of resolution synthesis parameters corresponding to an interpolation factor of four will be accessed from the database 18.

The database 18 can be generated off-line by the first computer 12 or another (second) computer 2. The second computer 2 includes a processor 4 and computer memory 6. A program 8 is stored in the memory 6 of the second computer 2. The program 8 includes a plurality of executable instructions that, when executed, instruct the processor 4 of the second computer 2 to generate the database 18. A method of generating the database 18 will be described below in connection with FIGS. 6 and 7. Once computed, the database 18 is transferred from the second computer 2 to the computer memory 20 of the first computer 12 (via a CD ROM, for example) or to the printer memory 22 of the printer 14. The method of generating the database 18 is performed off-line. Since the bulk of the computational activity is done prior to the actual interpolation, interpolation time and memory requirements of the first computer 12 and the printer 14 are reduced.

Figure 2A:
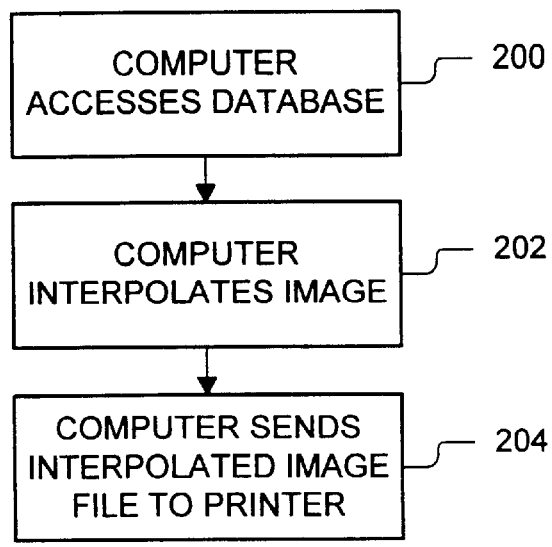
FIGS. 2a, 2b and 2c are flowcharts of different ways in which the first computer sends an image to the printer and the printer prints an interpolated image.
Figure 2B:
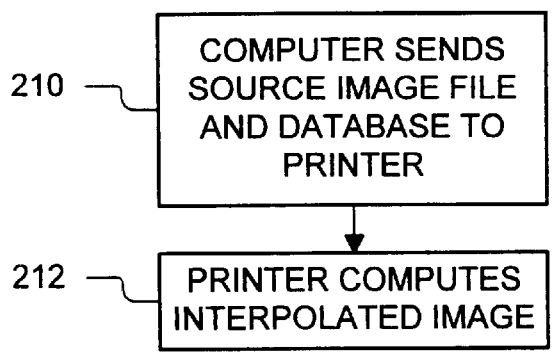
Figure 2C:
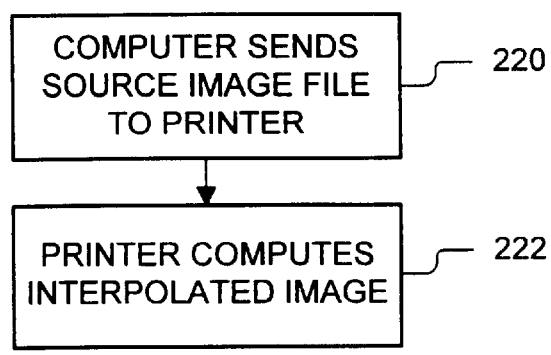

Additional reference is now made to FIGS. 2a, 2b and 2c, which illustrate three different examples in which the first computer 12 and the printer 14 use the database 18 to perform resolution synthesis. In the first example, as shown in FIG. 2a, the database 18 is stored in computer memory 20. To print an image in a source image file, a printer driver 19 instructs the first computer 12 to access the database 18 from its memory 20 (block 200), perform resolution synthesis on the source image file to compute an interpolated image (block 202), and send a file (block 204) including the interpolated image to the printer 14 for printing.

In the second example, as shown in FIG. 2b, the database 18 is also stored in computer memory 20, but the first computer 12 sends the source image file and a file including the database 18 to the printer 14 (block 210). Under instruction of a program 21 stored in the printer memory 22, the embedded processor 26 of the printer 14 performs resolution synthesis on the source image file (bock 212) and prints out the interpolated image.

In the third example, as shown in FIG. 2c, the database 18 is stored in the printer memory 22. The computer 12 sends only the source image file to the printer 14 (block 220), which performs resolution synthesis on the source image file (block 222) and prints out the interpolated image.

Figure 3:
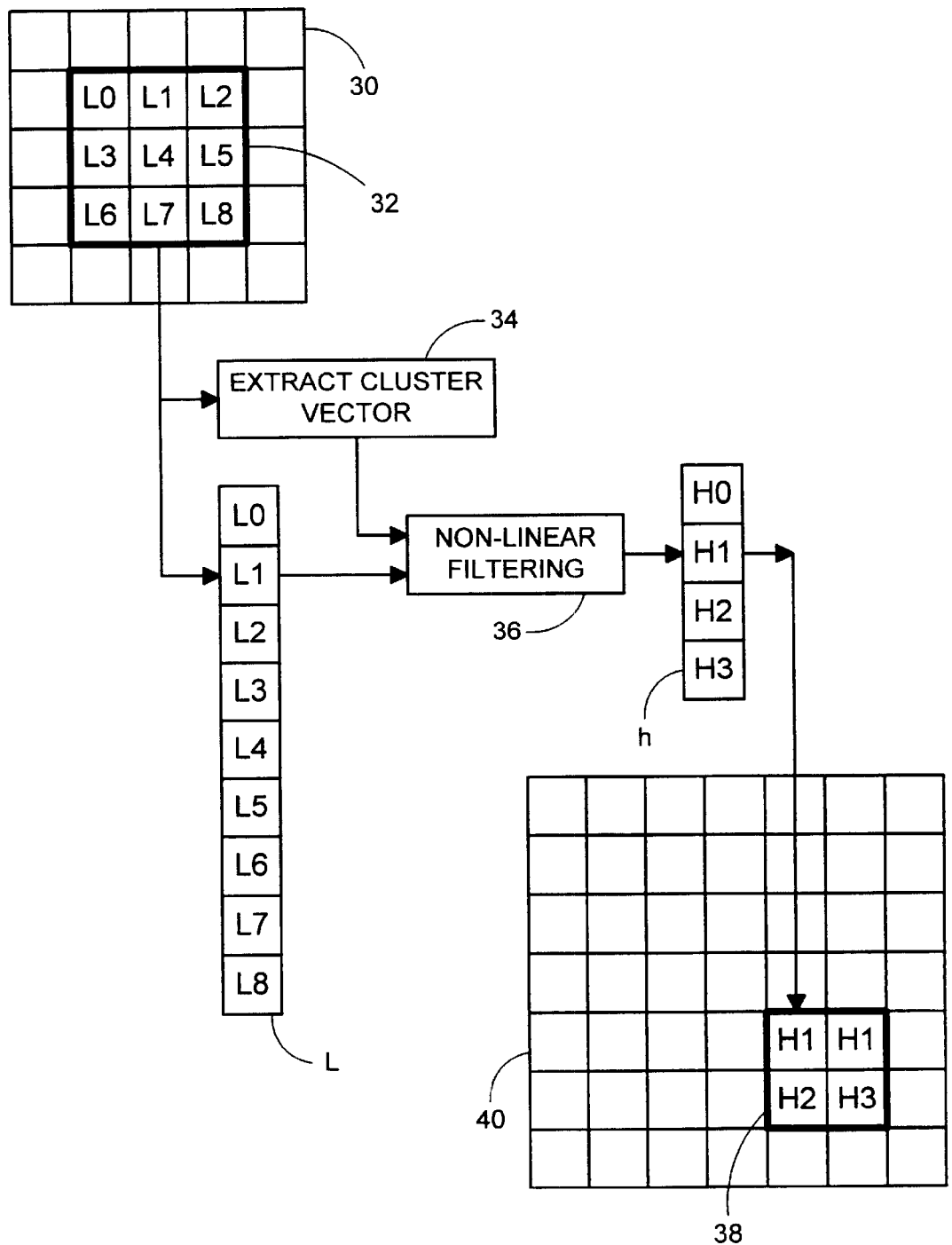
FIG. 3 is an illustration of an image interpolation method according to the present invention.

FIG. 3 illustrates a method of performing the resolution synthesis on a pixel L4 of an input image 30. An interpolation factor of 2 will be used by way of example. A small observation window 32 is located about the pixel L4 to be interpolated (the "sampled pixel") and encompasses neighboring pixels of the sampled pixel L4. The observation window 32 provides sufficient information for the sampled pixel L4 to be classified and interpolated The observation window 32 could be a 3×3 window, a 3×5 window, a 5×5 window, or larger. By way of example, however, the observation window 32 will hereinafter be described as a 3×3 window centered about the sampled pixel L4.

An observation vector L and a cluster vector y are extracted from the observation window 32. The observation vector L is extracted by stacking pixel values (e.g., intensity values of the luminance component) of the pixels in the observation window 32. Thus, nine pixel values would be stacked into the observation vector L extracted from a 3×3 window. Such an observation vector L would be represented as $$L = \{L0, L1, L2, L3, L4, L5, L6, L7, L8\}^t \quad (1)$$

where t is a vector transpose.

The cluster vector y is extracted (by block 34) using a nonlinear process. The cluster vector y contains information about a general type of image behavior (e.g., an edge, a smooth surface) in the observation window 32. To begin cluster vector extraction for the 3×3 window shown in FIG. 3, the eight nearest neighbors of the sampled pixel L4 are stacked into a first vector y1, where $$y1 = \{L0, L1, L2, L3, L5, L6, L7, L8\}^t. \quad (2)$$

A nominal value such as the value of the sampled pixel L4 is subtracted from each value in the first vector y1 to yield a second vector y2:

$$y2 = \{L0-L4, L1-L4, L2-L4, L3-L4, L5-L4, L6-L4, L7-L4, L8-L4\}^t. \quad (3)$$

Thus, the second vector y2 indicates differences between the sampled pixel L4 and its neighboring pixels. The cluster vector y is computed by scaling the second vector y2. Scaling can be performed by performing a projection operation f on the second vector y2. A non-linear scaling operation might be performed as follows:

$$\|y2\| = \sqrt{\sum_{\substack{i=0 \\ i \neq 4}}^{i=8} (Li - L4)^2} \quad (4)$$

$$y = f(y2) = \begin{cases} y2 \|y2\|^{p-1} & \text{if } y2 \neq 0 \\ 0 & \text{else} \end{cases} \quad (5)$$

where p is any scalar between zero and one. For example, the scalar p can equal 0.25. The projection function ultimately affects how well the edges and details are rendered in the interpolated image. Such generation of the cluster vector y is illustrated in FIG. 4.

A non-linear filtering operation is performed (by block 36) on the 9-dimensional observation vector L and the 8-dimensional cluster vector y. Parameters used to perform the non-linear filtering operation are accessed from the database 18. An output of each non-linear filtering operation produces a 2×2 window 38 of interpolated pixels H0, H1, H2, H3.

Thus, interpolation of a single pixel L4 in the input image 30 has been described. To interpolate the other pixels in the input image 30, the observation window 32 is moved around from pixel to pixel in the input image 30. For each non-border pixel L4 in the input image 30, four interpolated pixels H0, H1, H2, H3 are produced by the non-linear filtering. Border pixels can be interpolated by substituting the closest known pixels for all unknown pixels. A border pixel might be a pixel that cannot be centered within the observation window 32. After all of the pixels in the input image 30 have been interpolated, there is an interpolated image 40 having a resolution twice that of the input image 30.

The interpolation method can be applied to monochrome images and color images. When a color image is interpolated, cluster vectors from a luminance component of the color image are extracted, and the cluster vectors are used to perform non-linear filtering in each of the constituent Red-Green-Blue planes of the color image. Thus, the same database parameters are used to perform non-linear filtering on the Red plane as are used to perform non-linear filtering on the Green and Blue planes.

FIG. 5 shows the non-linear filtering operation in detail. Inputs include the resolution synthesis parameters stored in the database 18. The parameters include a number M of representative vectors RV, a number M of class weightings CW, a variance VAR and a set of interpolation filter coefficients a and b. The representative vectors RV, the relative class weights CW and the variance VAR will collectively be referred to hereinafter as a "classifier." Each representative vector RV represents a different image behavior. Examples of image behavior include horizontal edges, vertical edges, angled edges, smooth textures, etc. There might be between 50 and 100 representative vectors RV stored in the database 18. Thus, there might be between 50 and 100 representative vectors RV that can be used to synthesize the interpolated image 40 from the input image 30. The class weights CW correspond to how often the different representative vectors RV or behaviors occur. They convey the relative frequencies of the representative vectors RV. Thus, the class weight for flat pixels would typically be quite large relative to the class weight for vertical edges. The variance VAR is a positive number representing the level of variation within classes associated with the representative vectors.

The pixels in the input image 30 are sampled one at a time. When a pixel is sampled, its observation vector L and its cluster vector y are also provided as inputs to the non-linear filtering operation.

The cluster vector y is classified to determine the type of image behavior within the observation window 32 (block 42). That is, the cluster vector y is classified to determine whether the sampled pixel is part of a horizontal edge, a smooth texture, etc. A classification parameter p(j|y) is computed for j=0 to M−1 to indicate the representative vector RV or vectors RV that best represent the cluster vector of the sampled pixel. The classification parameter p(j|y) for a cluster vector y can be computed as follows:

$$p(j|y) = \frac{CW_j \exp\left(\frac{-\|y - RV_j\|^2}{2VAR}\right)}{\sum_{d=0}^{M-1} \left(CW_d \exp\left(\frac{-\|y - RV_d\|^2}{2VAR}\right)\right)} \quad (6)$$

where $$\|y - RV_j\|^2 = \sum_{m=0}^{7} (y(m) - RV_j(m))^2 \quad (7)$$

In equation (7), y(m) is the $m^{th}$ element in the cluster vector y, and $RV_j(m)$ is the $m^{th}$ element in the $j^{th}$ representative vector RV.

Equations (6) and (7) are derived under the assumption that a particular behavior might encompass a population of cluster vectors, with certain cluster vectors being more likely to fall under that behavior than others. Take an example in which pixels in the upper half of the observation window 32 are at full intensity while pixels in the lower half of the observation window 32 are at zero intensity. A cluster vector extracted from such a window 32 would indicate with high probability that the sampled pixel in the observation window 32 is part of an edge. If, however, the pixels in the lower half of the observation window 32 are half-scale, the probability is not as high.

Moreover, the equations (6) and (7) are derived under the assumption that the cluster vectors y are distributed as a multivariate Gaussian mixture. Taken as a group, the distributions of the various behaviors form a Gaussian mixture model. The distributions overlap. Consequently, a cluster vector (such as the cluster vector for an observation window having the upper half of its pixels at full scale and the lower half of its pixels at half-scale) might indicate a behavior that falls under multiple distributions. Thus, classification of a cluster vector y according to equations (6) and (7) is equivalent to computing probabilities of class membership in the Gaussian mixture model. The classification parameter p(j|y) for a cluster vector y indicates a series of weightings or probabilities corresponding to the different behaviors and, therefore, the different representative vectors RV.

Classifying a cluster vector y reveals the set or sets of interpolation filters 44 that should be used to interpolate the sampled pixel. Each set of interpolation filters 44 corresponds to a representative vector RV. After a cluster vector y has been classified, the corresponding observation vector L is filtered by the coefficients a(j,k), b(j,k) of the selected interpolation filter or filters 44, and the output of each filter 44 is multiplied (by blocks 46) by the probability that the observation vector L is represented by the representative vectors RV corresponding to that interpolation filter. Products of the multiplication are summed together (block 48). Thus, an interpolated pixel H(k) is computed as follows:

$$H(k) = \sum_{j=0}^{M-1} (a(j,k)L + b(j,k))p(j|y) \quad (8)$$

for k=0, 1, 2, and 3, where H(k) is the $k^{th}$ interpolated pixel in a vector h, and a(j,k) and b(j,k) are scalars representing the filter coefficients for the $j^{th}$ class and the $k^{th}$ interpolated pixel.

A computation could be performed for each interpolation filter 44, and outputs of all of the interpolation filters 44 could be multiplied by the classification parameter p(j|y). However, if a computation is to be performed for each interpolation filter 44, computational time might be excessive. Moreover, interpolating with representative vectors RV that are different from the image data might result in a waste of computational resources. Therefore, a different non-linear filtering operation might use the outputs of only one or two of the interpolation filters 44. This different operation would be more computationally efficient if many interpolation filters 44 were involved.

The interpolation method described in connection with FIGS. 3, 4 and 5 is also described in U.S. Ser. No. 08/837,619 filed Apr. 21, 1997 and entitled "Computerized Method for Improving Data Resolution." U.S. Ser. No. 08/837,619, which is assigned to the assignee of the present invention, is incorporated herein by reference.

Figure 6:
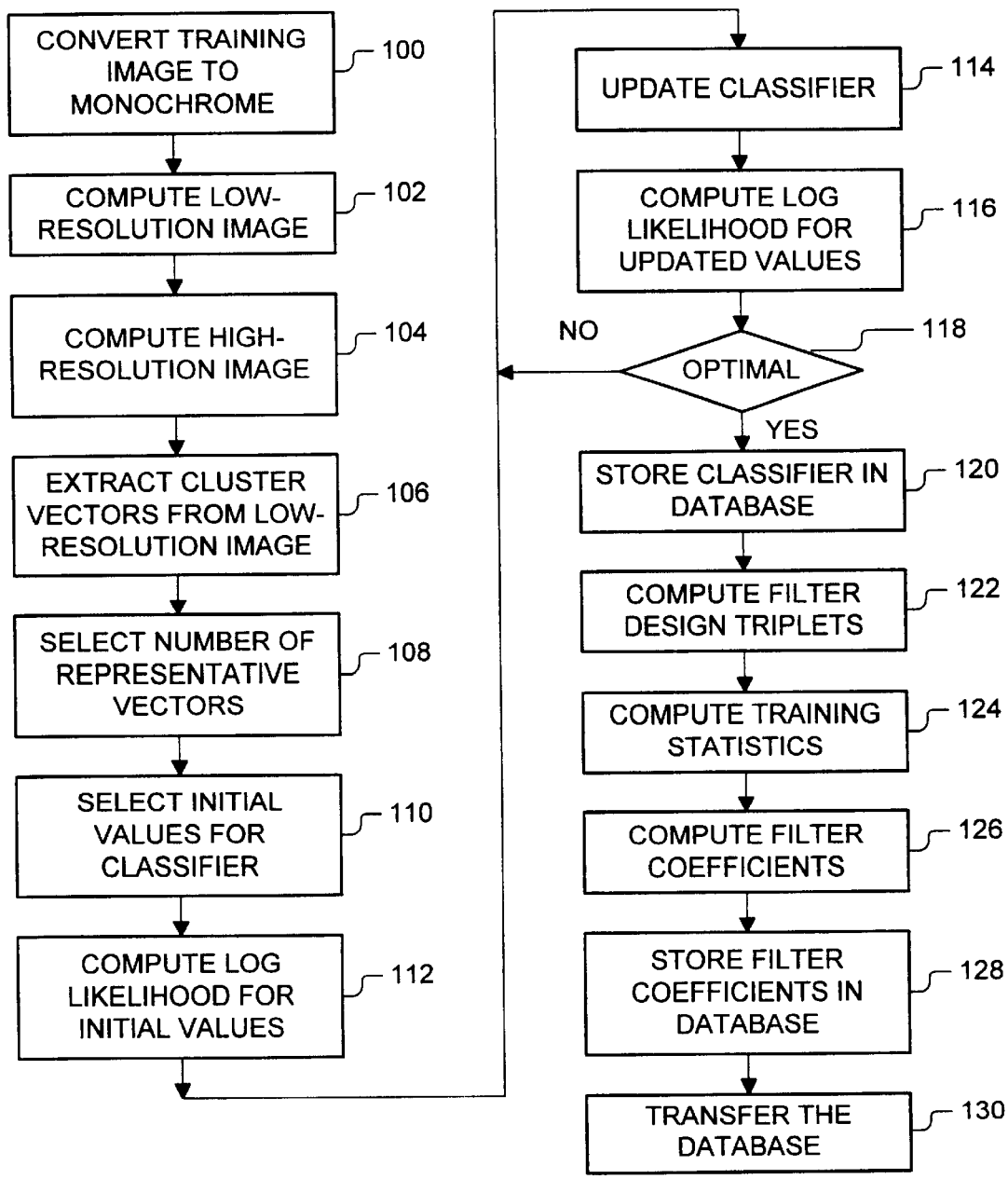
FIG. 6 is a method of generating a database of parameters for the non-linear filtering operation.

FIG. 6 shows a training method of generating the resolution synthesis parameters for the electronic database 18. The parameters are computed from at least one, but preferably more than one training image. Training images can include photo-quality color images, 600 dpi black and white images, etc. A collection of digital images are commonly available on photo CD and might provide a possible source for the training images. To simplify the description of the training method, the training method will hereinafter be described in connection with only a single training image.

The general premise of the training method is to generate a corrupted (e.g., low resolution) image from the training image and then compute a set of resolution synthesis parameters that can be used to predict or estimate the uncorrupted training image from the corrupted training image.

The training image is converted to a monochrome image, if necessary (block 100). For example, if the training image is a color image, it can be converted to a representation having a single plane. In the alternative, the luminance component of the color image can be extracted, whereby values of the pixels in the observation vector L would represent intensities of pixels in the luminance component.

A scaled-down or low resolution rendering of the monochrome image is computed (step 102). The interpolation factor dictates the level of image scaling. For an interpolation factor of two, each pixel in the low-resolution image is the average of the corresponding 2×2 block of pixels in the monochrome image. Specifically, the pixel LR(i,j) in the $i^{th}$ row and $j^{th}$ column of the low-resolution image is computed according to equation (9):

$$LR(i, j) = \frac{T(2i, 2j) + T(2i+1, 2j) + T(2i, 2j+1) + T(2i+1, 2j+1)}{4} \quad (9)$$

where T(i,j) is the $i^{th}$ row and $j^{th}$ column of the training image. If the monochrome training image has a height of H pixels and a width of W pixels, the low-resolution image has a height of H/2 pixels and a width of L/2 pixels, the number of pixels being rounded down to an integer.

A sharpened high-resolution rendering of the monochrome image may also be computed (step 104). The high-resolution image can be sharpened using an unsharp mask. A pixel SHR(i,j) in a sharpened, high-resolution image can be computed as follows:

$$A(i, j) = \frac{1}{9} \sum_{m=-1}^{1} \sum_{n=-1}^{1} T(i+m, j+n) \quad (10)$$

$$SHR(i,j)=T(i,j)+\lambda(T(i,j)-A(i,j)) \quad (11)$$

where λ is 1.0. Generally, λ is a non-negative constant which controls the level of sharpening and A(i,j) is an average of the pixels in a neighborhood around pixel (i,j). The dimensions of the sharpened, high-resolution image are the same as the dimensions of the monochrome image. This step 104 is optional. The uncorrupted training image can be used in place of the sharpened image. However, sharpening the training image improves edge quality in the interpolated image without the need for post-processing. For exemplary purposes, the training method will be described in connection with the sharpened high-resolution image.

A number NCV of cluster vectors are then extracted from the low-resolution image (block 106). The cluster vectors can be extracted from an observation window of any size and shape. Although the cluster vector extraction will be described hereinafter in connection with a 3×3 pixel observation window, a larger window such as a 5×5 pixel window could be used.

As for the number NCV of cluster vectors that may be extracted from the low resolution image, there are as many cluster vectors available as there are low-resolution pixels that are not on an image border. A reasonable range of numbers of cluster vectors is between 25,000 and 100,000. Using 25,000 cluster vectors will yield a fair-quality classifier at moderate computational cost, while using 100,000 cluster vectors will yield a high-quality classifier at significantly greater computational cost.

The cluster vectors are extracted from spatially different regions of the low-resolution image. To ensure this, the pixels are sampled at a period S1=N/NCV, where N is the total number of cluster vectors available. The sampling period S1 is truncated to an integer. Thus, a cluster vector is extracted at every $S1^{th}$ pixel of the low-resolution image. The pixels are sampled in a raster ordering, with the primary direction being from left to right and with the secondary direction being from top to bottom (the "mastering order").

For a 3×3 observation window, the cluster vector can be computed according to equations (2) to (5). However, it is not required to subtract the nominal value from the neighboring pixels in the first vector y1, nor is it required to scale the second vector y2. However, subtracting the nominal value and scaling will make it easier to discern the different types of cluster vectors. The purpose and effect of scaling is to warp the space of all of the cluster vectors so that edges of different magnitude but similar orientation or shape are grouped together.

After the cluster vectors have been extracted, a number M is selected (block 108). The number M represents the number of representative vectors that will be computed for the low-resolution image. The number M might be between 50 and 100. Larger numbers M of representative vectors will allow for more freedom because a wider variety of behaviors can be represented and used for resolution synthesis. However, the larger numbers M of representative vectors will also require more memory and computational resources.

After the number M is selected, the classifier (i.e., the representative vectors RV, the class weights CW and the variance VAR) are computed (blocks 110 to 118). A method of maximum likelihood estimation can be used to compute the classifier. One instantiation of the method of maximum likelihood estimation is the well-known expectation-maximization (EM) algorithm applied to Gaussian mixture models. Initial values for the classifier are selected and then iteratively updated until a locally optimal set of parameters has been obtained.

Thus, initial values are selected for the classifier (block 110). The initial values for the class weights CW can be selected as follows:

$$CW_0^{(0)} = \frac{1}{M}, \ldots, CW_{M-1}^{(0)} = \frac{1}{M} \quad (12)$$

The superscripts "(0)" indicate initial (zeroth) values for the class weights CW. The class weights CW are positive numbers that add up 1. That is, $CW_0>0, \ldots, CW_{M-1}>0$ and $\Sigma CW_i=1$ from i=0 to i=M−1.

The initial values for the representative vectors $RV_0, \ldots, RV_{M-1}$ can be set equal to the cluster vectors sampled at every $S2^{th}$ pixel of the low resolution image, where the sampling period S2=NCV/M. Thus, $$RV_i^{(0)}=y_{S2\times i} \quad (13)$$

for i=0, ..., M−1. The sampling period S2 ensures that the representative vectors $RV_0, \ldots, RV_{M-1}$ are initialized by cluster vectors from spatially different regions of the low-resolution image. The cluster vectors are selected from spatially separate regions of the low resolution image (or from different images if multiple images are available for training) to encourage the formation of distinct representative vectors.

The variance VAR can be initialized as follows:

$$VAR^{(0)} = \frac{1}{NCV \times 8} \sum_{m=0}^{7} \sum_{i=0}^{NCV-1} (y_i(m) - \bar{y}(m))^2 \quad (14)$$

where $y_i(m)$ is the $m^{th}$ element in the $i^{th}$ cluster vector, and $\bar{y}(m)$ is the sample mean of the $m^{th}$ element in the cluster vectors. The sample mean $\bar{y}(m)$ can be calculated as follows.

$$\bar{y}(m) = \frac{1}{NCV} \sum_{i=0}^{NCV-1} y_i(m) \quad (15)$$

Next a log likelihood LL(kl) is computed for the initial values (block 112). A log likelihood LL(yi;kl) for each cluster vector is calculated according to equations (16) and (17), and the log likelihood LL(kl) is computed by adding the log likelihoods of each cluster vectors according to equation (18):

$$\|y_i - RV_j^{(kl)}\|^2 = \sum_{m=0}^{7} (y_i(m) - RV_j^{(kl)}(m))^2 \quad (16)$$

$$LL(y_i; kl) = \log\left[\sum_{j=0}^{M-1} \frac{CW_j^{kl}}{(2\pi VAR^{(kl)})^4} \exp\left(\frac{-1}{2VAR^{(kl)}} \|y_i - RV_j^{(kl)}\|^2\right)\right] \quad (17)$$

$$LL(kl) = \sum_{i=0}^{NCV-1} LL(y_i; kl) \quad (18)$$

where the index kl indicates the $kl^{th}$ iteration (for example, LL(0) is the log likelihood for the initial values); $y_i(m)$ is the $m^{th}$ element in the $i^{th}$ cluster vector; $RV_j^{(kl)}(m)$ is the $m^{th}$ element of the $j^{th}$ representative vector in the $kl^{th}$ iteration; $LL(y_i; kl)$ is the log likelihood of an individual cluster vector $y_i$ during the $kl^{th}$ iteration; log is base e, and "exp" denotes the exponential function. The log likelihood is a number that is analogous to a measure of the quality of the current values for the classifier. A higher log likelihood indicates a better "fit" for the classifier.

After the log likelihood LL(0) is computed for the initial values of the classifier, the classifier is updated. The index kl is incremented (kl→kl+1) and the updates are made as follows.

$$p(j | y_i; kl - 1) = \frac{\exp\left(\frac{-\|y_i - RV_j^{(kl-1)}\|^2}{2VAR^{(kl-1)}}\right) CW_j^{(kl-1)}}{\sum_{d=0}^{M-1} \exp\left(\frac{-\|y_i - RV_d^{(kl-1)}\|^2}{2VAR^{(kl-1)}}\right) CW_d^{(kl-1)}} \quad (19)$$

$$NCV_j^{(kl)} = \sum_{i=0}^{NCV} p(j | y_i; kl - 1) \quad (20)$$

$$CW_j^{(kl)} = \frac{NCV_j^{(kl)}}{NCV} \quad (21)$$

$$RV_j^{(kl)} = \frac{1}{NCV_j^{(kl)}} \sum_{i=0}^{NCV-1} y_i p(j | y_i; kl - 1) \quad (22)$$

$$VAR^{(kl)} = \frac{1}{8} \sum_{j=0}^{M-1} \frac{CW_j^{(kl)}}{NCV_j^{(kl)}} \sum_{i=0}^{NCV-1} \|y_i - RV_j^{(kl)}\|^2 p(j | y_i; kl - 1) \quad (23)$$

The parameter $p(j|y_i;kl-1)$ can be considered a measure of the extent to which a cluster vector $y_i$ belongs to the jth representative vector of the $(kl-1)^{th}$ iteration. NCV(kl) can be considered as an estimate of the number of cluster vectors in the jth class of the previous iteration. The updates in equations (21), (22) and (23) can be considered as sample statistics that are weighted and normalized in accordance with the classifications under the previous iteration.

Next, a log likelihood LL(1) is computed for the updated classifier (block 116). The log likelihood LL(1) for the updated classifier is also computed according to the equations (16), (17) and (18) above.

A decision is then made as to whether the current values for the representative vectors RV, the class weights CW and the variance VAR are optimal (block 118). The decision can be made by taking the difference between the log likelihoods of the current and previous iterations LL(1) and LL(0) and comparing the difference to a threshold THRES. The threshold THRES indicates whether the likelihood is approaching a local maximum. The threshold THRES can be computed as follows:

$$THRES = 0.09 \times \log(8 \times NCV) \quad (24)$$

where the log is base e. If the difference is greater than the threshold THRES, another update is performed (block 114). If the difference is less than the threshold THRES, the values of the $kl^{th}$ iteration for the classifier are stored in the database (block 120).

After the classifier has been computed, the coefficients a, b for the interpolation filters are computed (blocks 122 to 126). A number NFDV of filter design triplets are computed from pixels in the low resolution image (block 122). Each filter design vector triplet includes a cluster vector y, an observation vector L which contains low-resolution pixels, and a vector h which contains high-resolution pixels. All three of these vectors y, L and h correspond to exactly one pixel in the low-resolution image. The set of filter design vector triplets will be referred to as $$\{(y_i, L_i, h_i)\}_{i=0}^{NFDV-1},$$

where $(y_i, L_i, h_i)$ is the filter design vector triplet for the $i^{th}$ pixel in the low-resolution image.

As for the number NFDV of design triplets, there may be as many filter design vector triplets available as there are low-resolution image pixels from which cluster vectors may be extracted. Higher numbers NFDV of filter design vector triplets will yield better results at the cost of increased computation. Satisfactory results can be obtained by using 500,000 filter design vector triplets, while better results can be obtained by using over 1,000,000 filter design vector triplets.

The high-resolution pixel vector h is computed by stacking a 2×2 block of high-resolution pixels which correspond to a pixel in the low-resolution image. Specifically for a low-resolution pixel LR(i,j) at location i,j in the low resolution image, the corresponding pixels in the 2×2 block of the high resolution image are at locations (2*i,2*j), (2*i+1, 2*j), (2*i, 2*j+1), and (2*i+1, 2*j+1).

The filter design triplets can be sampled from spatially different regions of the low-resolution image. A sampling period S3 might be N/NFDV, where N is the total number of filter design vector triplets available. The sample period S3 is truncated to an integer. One by one, in the rastering order, a filter design vector triplet is extracted at every S3$^{th}$ pixel in the low-resolution image.

Next, training statistics are computed for each representative vector (block 124). Training statistics for the j$^{th}$ representative vector can be computed as follows:

$$NFDV_j = \sum_{i=0}^{NFDV-1} p(j|y_i) \tag{25}$$

$$mL_j = \frac{1}{NFDV_j} \sum_{i=0}^{NFDV-1} L_j p(j|y_i) \tag{26}$$

$$mh_j = \frac{1}{NFDV_j} \sum_{i=0}^{NFDV-1} h_i p(j|y_i) \tag{27}$$

$$GLL_j = \frac{1}{NFDV_j} \sum_{i=0}^{NFDV-1} (L_i - mL_j)(L_i - mL_j)^t p(j|y_i) \tag{28}$$

$$GhL_j = \frac{1}{NFDV_j} \sum_{i=0}^{NFDV-1} (h_i - mh_j)(L_i - mL_j)^t p(j|y_i) \tag{29}$$

where $mL_j$ is a 9-dimensional vector and $mh_j$ is a 4-dimensional vector, $GLL_j$ is a 9×9 matrix, and $GhL_j$ is a 4×9 matrix. Superscript "t" denotes the vector transpose.

Finally, the coefficients a, b for the interpolation filters are computed from the training statistics (block 126). Each interpolation filter produces a pixel in the high resolution image. The set of interpolation filters can be represented as $$\left\{ \{a(j,k), b(j,k)\}_{k=0}^{3} \right\}_{j=0}^{M-1},$$

where k represents the k$^{th}$ output pixel in the high resolution image (for k=0, ... 3). The vector a(j,k) is the kth row of a 4×9 matrix Aj, and the scalar b(j,k) is the k$^{th}$ element in a 4-dimensional vector bj. The matrix Aj and the vector bj can be computed according to equations (30) and (31). The superscript "−1" denotes taking the matrix inverse (or pseudo-inverse, if necessary).

$$A_j = GhL_j(GLL_j)^{-1} \tag{30}$$

$$b_j = mh_j - GhL_j(GLL_j)^{-1} mL_j \tag{31}$$

The coefficients for the interpolation filters are stored in the database 18 (block 128). The database 18 can be stored on a medium such as CD-ROM for transfer to another computer, it can be transferred to another computer or printer via a network, or it can be programmed into an EEPROM of a printer (block 130). The database 18 can be used as described above in connection with FIGS. 2a to 2c.

Thus disclosed are an interpolation method for producing high quality interpolated images and a training method for generating a database of parameters for the interpolation method. The training method is run off-line in a computer. The database of parameters need only be generated once, but it may be used many times by the interpolation method. Once the parameters have been generated, the interpolation method is easy to implement in terms of processing power and memory requirements.

Although the system shown in FIG. 1 was described in connection with a printer, the system is not so limited. The invention could be applied to the Internet. For example, many web pages display thumbnails of images. Clicking on a thumbnail causes a higher resolution image to be downloaded. If a web browser is capable of performing resolution synthesis according to the present invention, the higher resolution image need not be downloaded when the thumbnail is clicked. Instead, the web browser would access the database (from either its hard drive or the server) and generate a high-resolution image from the thumbnail. The high-resolution image would be displayed much faster than downloading a high resolution image file over a modem connection. Additionally, less server memory would be needed to store the web pages.

The invention can be used by any computer to increase resolution of a displayed image. For example, the interpolation method can be used by a computer to zoom in on an area of an image. The zoomed-in area would have smooth, continuous edges.

Moreover, the invention is not limited to image processing. The invention could be applied to the enhancement or restoration of speech, still image, video, and other multidimensional signals.

Figure 7:
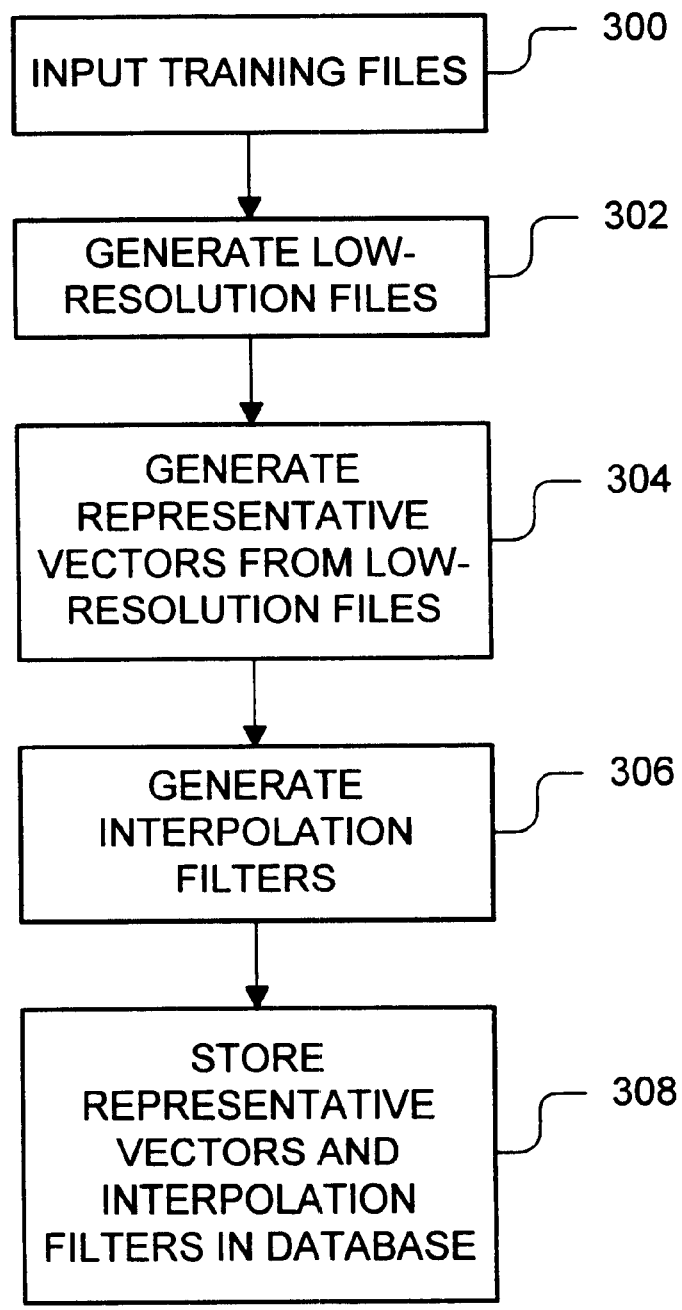
FIG. 7 is a more generalized method of generating the database.

FIG. 7 shows a more generalized method of building a database that could be applied to resolution synthesis of speech or the restoration of images. Resolution synthesis parameters are generated from at least one training file. All training files are inputted (block 300), low-resolution files are generated from the training files (block 302), and a plurality of representative vectors are computed from the low-resolution files (block 304). A set of interpolation filters is generated for each of the representative vectors (block 306). The interpolation filters and the representative vectors are stored in the database (block 308) and can be used later to perform data resolution synthesis on a file other than the training file. If generated from training files including speech pattern data, the database can be used by a computer to restore or synthesize low-quality audio files containing speech. Similarly, if generated from training files including data representing a damaged image, the database can be used by a computer to restore the image.

Specific embodiments of the invention have been described and illustrated above. However, the invention is not limited to these specific embodiments. Any number and type of training images can be used to create the database. The low-resolution images can be computed in any number of ways other than block averaging. The optional sharpened images can be computed in any number of ways other than unsharp masking.

The actual number NCV of cluster vectors will depend upon the computational power of the computer that is generating the database and the desired quality of the interpolated images. Increasing the number NCV of the cluster vectors will also increase the computational time. However, increasing the number NCV of cluster vectors will increase the amount of information used for interpolation and, therefore, will increase the quality of the interpolated image. Therefore, it might be feasible to use far more than 100,000 cluster vectors.

The same holds true of the number M of classes. Increasing the number M of classes will increase computation time. However, increasing the number of classes will increase the variety of behaviors that can be recognized and used to perform image interpolation. A single class could even be used, in which case the best class would be selected. If only a single class is selected, class weights would not have to be computed.

It is assumed that the observation window gives all the information needed to interpolate a sampled pixel. Of course, the assumption will hold truer for larger observation windows. Therefore, it might be desirable to use an observation window that is larger than 3×3 pixels.

Generating the representative vectors is not limited to the expectation maximization technique. Any of a large number of suitable parameter optimization techniques could be used for generating representative vectors from a group of cluster vectors. Examples include conjugate gradient and gradient search techniques and simulating annealing.

Generating the cluster vectors is not limited to the methods described above. The cluster vectors could be generated by a wide variety of clustering methods such as iso-data clustering, K-means clustering, general vector quantization, and tree-structure quantization.

Therefore, the invention is not limited to the specific embodiments described and illustrated above. Instead, the invention is construed according to the claims that follow.

What is claimed is:

1. A method of building an electronic database for data resolution synthesis from at least one training file, the method comprising:
   generating a low-resolution file from each training file;
   generating a plurality of representative vectors from the low-resolution files;
   wherein the representative vectors are generated by computing a number of cluster vectors from each low-resolution file and statistically extracting the representative vectors from the cluster vectors;
   generating a set of interpolation filters for each of the representative vectors; and
   whereby the interpolation filters and the representative vectors can be used to perform data resolution synthesis on a file other than the training file.

2. The method of claim 1, wherein the interpolation filters are linear filters.

3. The method of claim 1, wherein the representative vectors are generated by using a parameter optimization technique.

4. The method of claim 1 wherein windows are formed, each window encompassing a sampled pixel and neighboring pixels; and, for each window, using intensities of pixels inside the window and image behavior of the neighboring pixels to determine the interpolation filters.

5. A method of building an electronic database for data resolution synthesis from at least one training file, the method comprising:
   generating a low-resolution file from each training file;
   generating a plurality of representative vectors from the low-resolution files; wherein the representative vectors are generated by computing a number of cluster vectors from each low-resolution file and statistically extracting the representative vectors from the cluster vectors;
   generating a set of interpolation filters for each of the representative vectors; whereby the interpolation filters and the representative vectors can be used to perform data resolution synthesis on a file other than the training file; and
   the representative vectors are statistically extracted by using an expectation maximum likelihood estimate.

6. A method of building an electronic database for data resolution synthesis from at least one training file, the method comprising:
   generating a low-resolution file from each training file;
   generating a plurality of representative vectors from the low-resolution files;
   wherein
      the representative vectors are generated by computing a number of cluster vectors from each low-resolution file and statistically extracting the representative vectors from the cluster vectors;
   generating a set of interpolation filters for each of the representative vectors; whereby the interpolation filters and the representative vectors can be used to perform data resolution synthesis on a file other than the training file; and
   the representative vectors are statistically extracted by using an expectation maximization technique.

7. A method of building an electronic database for data resolution synthesis from at least one training file, the method comprising:
   generating a low-resolution file from each training file;
   generating a plurality of representative vectors from the low-resolution files; wherein the representative vectors are generated by computing a number of cluster vectors from each low-resolution file and statistically extracting the representative vectors from the cluster vectors;
   generating a set of interpolation filters for each of the representative vectors; whereby the interpolation filters and the representative vectors can be used to perform data resolution synthesis on a file other than the training file;
   cluster vectors are computed by sampling the pixels; and
   for each sampled pixel, creating a vector based on image intensities of pixels neighboring the sampled pixel.

8. A method of building an electronic database for data resolution synthesis from at least one training file, the method comprising:
   generating a low-resolution file from each training file;
   generating a plurality of representative vectors from the low-resolution files;
   wherein
      the representative vectors are generated by computing a number of cluster vectors from each low-resolution file and statistically extracting the representative vectors from the cluster vectors;
   generating a set of interpolation filters for each of the representative vectors;
   whereby
      the interpolation filters and the representative vectors can be used to perform data resolution synthesis on a file other than the training file;
   cluster vectors are computed by sampling the pixels;
   for each sampled pixel, creating a vector based on image intensities of pixels neighboring the sampled pixel; and
   performing non-linear filtering on each vector of image intensities.

9. A method of building an electronic database for data resolution synthesis from at least one training file, the method comprising:
   generating a low-resolution file from each training file;
   generating a plurality of representative vectors from the low-resolution files generating a set of interpolation filters for each of the representative vectors; whereby the interpolation filters and the representative vectors can be used to perform data resolution synthesis on a file other than the training file;
   generating observation vectors and cluster vectors; and
   using the observation vectors, the cluster vectors, and the representative vectors to generate the interpolation filters.

10. The method of claim 9, wherein each representative vector represents a different image behavior.

* * * * *